(12) United States Patent
Karanam et al.

(10) Patent No.: US 11,681,559 B2
(45) Date of Patent: *Jun. 20, 2023

(54) EXECUTING COMPUTING MODULES USING MULTI-CORING

(71) Applicant: Capital One Services, LLC, McLean, VA (US)

(72) Inventors: Sravankumar Karanam, Frisco, TX (US); Manjula Marakani, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 32 days.

This patent is subject to a terminal disclaimer.

(21) Appl. No.: 17/035,031

(22) Filed: Sep. 28, 2020

(65) Prior Publication Data

US 2021/0073032 A1 Mar. 11, 2021

Related U.S. Application Data

(63) Continuation of application No. 16/563,240, filed on Sep. 6, 2019, now Pat. No. 10,789,103.

(51) Int. Cl.
*G06F 9/50* (2006.01)
*G06F 16/903* (2019.01)
*G06F 9/54* (2006.01)
*H04L 67/00* (2022.01)

(52) U.S. Cl.
CPC .............. *G06F 9/505* (2013.01); *G06F 9/546* (2013.01); *G06F 16/90344* (2019.01); *H04L 67/34* (2013.01)

(58) Field of Classification Search
CPC .... G06F 9/505; G06F 9/546; G06F 16/90344; G06F 16/951
See application file for complete search history.

(56) References Cited

U.S. PATENT DOCUMENTS

| | | | |
|---|---|---|---|
| 6,445,829 B1 | 9/2002 | Shyu | |
| 9,672,188 B2 | 6/2017 | Vorbach | |
| 9,854,002 B1 * | 12/2017 | Streete | .................. H04L 63/20 |
| 9,912,549 B2 | 3/2018 | Rieke | |
| 10,275,502 B2 | 4/2019 | Hubmann et al. | |
| 10,275,778 B1 | 4/2019 | Maag et al. | |
| 10,305,758 B1 | 5/2019 | Bhide et al. | |

(Continued)

OTHER PUBLICATIONS

"MapReduce", Jan. 10, 2017, Wikipedia (Year: 2017).

*Primary Examiner* — Dong U Kim
(74) *Attorney, Agent, or Firm* — Sterne, Kessler, Goldstein & Fox P.L.L.C.

(57) ABSTRACT

Described herein is a system for identifying controls not aligned with updated compliance data. The system may scrub external data sources for updated compliance data. The system may detect and extract the updated compliance data from the external data sources. The system may identify and correlate controls of compliance applications currently using compliance data which has now been updated. The system determines whether a control exists to cover the updated compliance data. In the event, a control does not exist or an existing control does not cover the updated compliance data, a requirement may be generated for generating a new control or modifying an existing control for the updated compliance data.

18 Claims, 7 Drawing Sheets

(56) References Cited

U.S. PATENT DOCUMENTS

| | | | |
|---|---|---|---|
| 2010/0161508 A1* | 6/2010 | Planitzer | G06Q 30/02 705/36 R |
| 2011/0047525 A1 | 2/2011 | Castellanos et al. | |
| 2014/0331277 A1* | 11/2014 | Frascadore | G06F 21/577 726/1 |
| 2016/0072831 A1* | 3/2016 | Rieke | H04L 43/045 726/1 |
| 2016/0092585 A1* | 3/2016 | Bhat | G06F 16/9535 707/706 |
| 2017/0249644 A1* | 8/2017 | DiMaggio | G06Q 30/018 |
| 2017/0251013 A1 | 8/2017 | Kirti et al. | |
| 2017/0302586 A1 | 10/2017 | Suchter et al. | |
| 2018/0027006 A1 | 1/2018 | Zimmermann et al. | |
| 2018/0103014 A1 | 4/2018 | Birger | |
| 2018/0300829 A1 | 10/2018 | Crabtree et al. | |
| 2018/0375892 A1* | 12/2018 | Ganor | H04L 63/20 |
| 2019/0052602 A1 | 2/2019 | Abraham | |
| 2019/0073138 A1 | 3/2019 | Kavanagh et al. | |
| 2019/0075082 A1* | 3/2019 | Adam | G06F 21/577 |
| 2019/0220311 A1 | 7/2019 | Zhao et al. | |
| 2019/0244608 A1 | 8/2019 | Choi et al. | |
| 2020/0036687 A1* | 1/2020 | May | H04W 12/02 |

\* cited by examiner

EXECUTING COMPUTING MODULES USING MULTI-CORING

CROSS-REFERENCE TO RELATED APPLICATIONS

This application is a continuation application of U.S. patent application Ser. No. 16/563,240, filed on Sep. 6, 2019, the contents of which are incorporated herein in their entirety.

BACKGROUND

Large entities such as financial institutions, retail stores, educational institutions, government agencies, and/or the like are required to comply with regulations, laws, and/or statutes implemented and enforced by government institutions. To ensure that these large entities comply with the regulations, laws, and/or statutes large entities have developed applications including executable code for verifying the large entities are complying with the regulations, laws, and/or statutes. Compliance application may verify an entity's compliance with financial regulations, cybersecurity laws, privacy laws, and/or the like. Compliance applications may verify an entity's compliance with compliance data such as with laws, regulations, and/or statutes of various regulatory agencies. The regulatory agencies may update or create new regulations at a rapid pace. Conventionally, users may have to manually browse external data sources to identify updated compliance data and then manually determine which controls of the compliance applications are affected by the updated compliance data. This can be a long and error-prone process, which can use large amounts of computational resources for long periods of time.

Certain compliance applications implemented by large entities may electronically process large amounts of data and execute large amounts of calculations on a daily basis. Additionally, the compliance applications may include functions configured to perform a variety of tasks. The functions may execute a specified set of tasks. Each function may process data, execute calculations, and make function calls. Heavy computations that are not serializable and take large amounts of time can use large amounts of computational resources, and cause bottlenecks and network latency. Certain functions may take hours or days to complete due to millions of records and large amounts of calculations to be executed. Conventionally, entities would have to wait to execute computationally expensive functions when the usage of computer resources and the network is at a minimum. This can be inefficient as functions may need to be executed at any time of the day.

BRIEF DESCRIPTION OF THE FIGURES

The accompanying drawings, which are incorporated herein and form part of the specification, illustrate the present disclosure and, together with the description, further serve to explain the principles of the disclosure and enable a person skilled in the relevant art to make and use the disclosure.

The drawing in which an element first appears is typically indicated by the leftmost digit or digits in the corresponding reference number. In the drawings, like reference numbers may indicate identical or functionally similar elements.

DETAILED DESCRIPTION

Described herein is a system for identifying controls not aligned with updated compliance data. The system may scrub external data sources for updated compliance data. The system may detect and extract the updated compliance data from the external data sources. The system may identify and correlate controls of compliance applications currently using compliance data which has now been updated. The system determines whether a control exists to cover the updated compliance data. In the event a control does not exist for the updated compliance data, a requirement may be generated for generating a new control for the updated compliance data. In the event a control for the updated compliance data exists, the system may determine whether the control covers the updated compliance data. In the event the control data does not cover the updated compliance data, the system may generate a requirement for modifying the existing control to cover the updated compliance data. The requirements may be output into a database.

The system solves a technical problem of manually having to search external data sources one by one, extract compliance data from the external data sources and correlating the controls of the compliance application with the extracted compliance data, which can be time-consuming and error-prone. Conventionally, this would require numerous queries and computational resources utilized over a long time period. The system described herein solves these problems by automatically extracting updated compliance data in a single execution of a scraping application, and correlating the compliance application with the extracted compliance data.

Additionally, the system described herein may determine whether a function (i.e., the scraping function) is suitable to be executed using multi-coring. That is the system determines whether a function is suitable to be executed by one or more computing cores in a dedicated fashion. The system identifies one or more available computing cores and executes the function on the one or more available computing cores. The one or more available computing cores can be dedicated to execute the function until the execution of the function is complete. For purposes of saving time and efficiency, the one or more available computing cores executes the tasks of the function asynchronously. The system receives output data from the function asynchronously in a list data structure. It can be appreciated that the output data may also be received as an array, stack, queue, and/or the like, but the output data will be discussed as a list throughout for the purposes of example, and not limitation. The system can maintain a desired order of the output data in the list data structure. Once the function has executed, the system converts the list data structure into a data frame data structure by transposing the data from the list data structure into the data frame data structure in the desired order.

The system solves a technical problem of network bottlenecks and network latency by dedicating computing cores to execute specific functions. In this configuration, other computing cores are available to execute other functions. Additionally, the system can quickly execute the functions by asynchronously executing the tasks of the function while maintaining the desired order of the output of the function.

Figure 1:
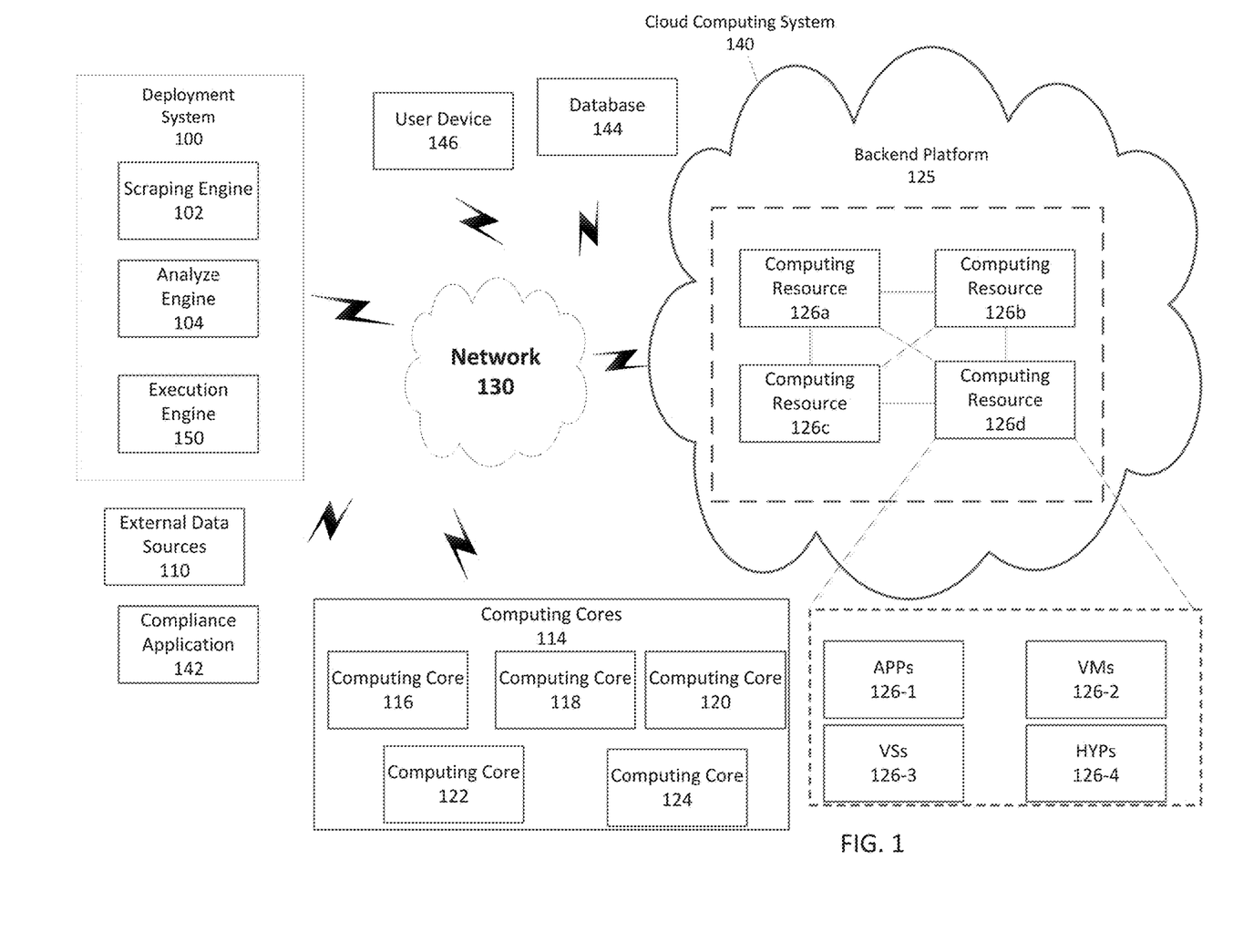
FIG. 1 is a block diagram of an example environment in which systems and/or methods for determining whether a compliance application is aligned with updated compliance data may be implemented according to an example embodiment.

FIG. 1 is a block diagram of an example environment 100 in which systems and/or methods described herein may be implemented. The environment 100 may include a deployment system 100. The deployment system 100 may include a scraping engine 102, an analyzing engine 104, and execution engine 150. Environment 100 may further include external data sources 110, a compliance application 142, a database 144, a user device, and computing cores 114. Computing cores 114 may be a pool of computing cores which includes several individual computing cores such as computing core 116, computing core 118, computing core 120, computing core 122, and computing core 124. Database 144 may store all of the controls and compliance data used by the controls. The devices of the environment 100 may be connected through wired connections, wireless connections, or a combination of wired and wireless connections. Deployment system 100, compliance application 142, database 144, user device, and computing cores 114, may reside within the cloud computing environment 140. Alternatively, deployment system 100, compliance application 142, database 144, user device, and computing cores 114, may reside outside the cloud computing environment 140.

In an example embodiment, one or more portions of the network 130 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The backend platform 125 may include a server or a group of servers. In an embodiment, the backend platform 125 may be hosted in a cloud computing environment 120. It may be appreciated that the backend platform 125 may not be cloud-based, or may be partially cloud-based.

The cloud computing environment 120 includes an environment that delivers computing as a service, whereby shared resources, services, etc. may be provided to testing system 100, testing environment 120, and user device 132. The cloud computing environment 120 may provide computation, software, data access, storage, and/or other services that do not require end-user knowledge of a physical location and configuration of a system and/or a device that delivers the services. The cloud computing system 140 may include computer resources 126.

Each computing resource 126a-d includes one or more personal computers, workstations, computers, server devices, or other types of computation and/or communication devices. The computing resource(s) 126a-d may host the backend platform 125. The cloud resources may include compute instances executing in the cloud computing resources 126a-d. The cloud computing resources 126a-d may communicate with other cloud computing resources 126a-d via wired connections, wireless connections, or a combination of wired or wireless connections.

Computing resources 126a-d may include a group of cloud resources, such as one or more applications ("APPs") 126-1, one or more virtual machines ("VMs") 126-2, virtualized storage ("VS") 126-3, and one or more hypervisors ("HYPs") 126-4.

Application 125-1 may include one or more software applications that may be provided to or accessed by the user device 140. In an embodiment, the application 204 may execute locally on the user device 140. Alternatively, the application 126-1 may eliminate a need to install and execute software applications on the user device 140. The application 126-1 may include software associated with backend platform 125 and/or any other software configured to be provided across the cloud computing environment 120. The application 126-1 may send/receive information from one or more other applications 126-1, via the virtual machine 126-2.

Virtual machine 126-2 may include a software implementation of a machine (e.g., a computer) that executes programs like a physical machine. Virtual machine 126-2 may be either a system virtual machine or a process virtual machine, depending upon the use and degree of correspondence to any real machine by virtual machine 126-2. A system virtual machine may provide a complete system platform that supports execution of a complete operating system (OS). A process virtual machine may execute a single program and may support a single process. The virtual machine 126-2 may execute on behalf of a user (e.g., user device 140) and/or on behalf of one or more other backend platforms 125, and may manage infrastructure of cloud computing environment 120, such as data management, synchronization, or long duration data transfers.

Virtualized storage 126-3 may include one or more storage systems and/or one or more devices that use virtualization techniques within the storage systems or devices of computing resource 126. With respect to a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how administrators manage storage for end users. File virtualization may eliminate dependencies between data accessed at a file level and location where files are physically store. This may enable optimization of storage use, server consolidation, and/or performance of non-disruptive file migrations.

Hypervisor 126-4 may provide hardware virtualization techniques that allow multiple operations systems (e.g., "guest operating systems") to execute concurrently on a host computer, such as computing resource 126. Hypervisor 126-4 may present a virtual operating platform to the guest operating systems, and may manage the execution of the guest operating systems multiple instances of a variety of operating systems and may share virtualized hardware resource.

In an embodiment, compliance application 142 may be an executable application which verifies an entity's compliance with specified laws, regulations, and/or statutes. Different compliance applications 142 may verify entity's compliance with different types of laws, regulations, and/or statutes. For example, one compliance application 142 may verify an entity's compliance with financial laws, regulations, and/or statutes of a geographic region, while another compliance application 142 may verify an entity's compliance a cyber-security laws, regulations, and/or statutes of a geographic region. Alternatively, a single compliance application 142 may verify an entity's compliance of all relevant laws, regulations, and/or statutes of a geographic region. The entity may be a financial institution, social media company, retail store, ecommerce website, government institution, educational institution, and/or the like.

Compliance application 142 includes controls which control the operation of compliance application 142 based on the current compliance data. Compliance data may be relevant laws and/or statutes. As an example, a given law may require two-step authentication for logging onto an entity's mobile application. Compliance application 142 may include a control to interrogate the entity's mobile application source code to confirm the entity's mobile application requires two-step authentication for logging onto the mobile application. In the event the mobile application does not require two-step authentication, the control of compliance application 142 may generate an error or alert.

To effectively and accurately execute compliance application 142, it is necessary to provide the most current compliance data to the compliance application 142, so that the controls can confirm the correct information. In this regard, deployment system 100 may execute scraping engine 102 to scrub external data sources 110 for updated compliance data. External data sources 110 may include databases, data repositories, websites, web services, RSS feeds, and/or the like. Scraping engine 102 may be a SCRAPY application developed in Python. The SCRAPY application is a web-crawler frame work that is configured to extract data from websites. Scraping engine 102 may extract data using Application Program Interfaces (APIs) or can be configured to be a general web-crawler.

Scraping engine 102 may include a set of instructions to search for and extract compliance data from various websites. Scraping engine 102 may include instructions to search for alphanumeric strings such as "new law", "update in regulation", "new legislation", and/or the like. Scraping engine 102 may include instructions to extract any alphanumeric text relevant to updated compliance data. As an example, scraping engine 102 determines a date and time a "new law", "update in regulation", or "new legislation" has been posted on a website. If the new date and time within a specified time period (e.g., within the last week; last month; or last 6 months), then scraping engine 102 extracts the "new law", "update in regulation", or "new legislation" from the website.

Scraping engine 102 may return the updated compliance data to analyze engine 104. The updated compliance data may include multiple different updated laws, regulations, and/or statutes, and their relevant regulation ID. The regulation ID may be an identification number of the law, regulation, and/or statute. For example, the regulation ID may be a statute number, U.S. Title and Section number, and/or the like.

Analyze engine 104 may query database 144 to retrieve the current compliance data stored in the database 144. Analyze engine 104 may compare the current compliance data to the updated compliance data to determine the difference between the current compliance data and the updated compliance data. Analyze engine 104 may query database 144 to retrieve any controls relevant to the updated compliance data. Analyze engine 104 may correlate all of the controls to relevant to the updated compliance data. As described above, scraping engine 102 may return multiple different updated laws, regulations, and/or statutes and their relevant regulation ID. Analyze engine 104 may correlate the relevant control with each updated compliance data by matching a regulation ID of compliance data currently used by compliance application 142 with the regulation ID of the updated compliance data.

Analyze engine 104 may determine whether a control exists for the updated compliance data. In the event a control does not exist for the updated compliance data, analyze engine may generate a requirement for generating a new control for the updated compliance data. For example, the updated compliance data may be a new law, regulation, and/or statute. In the event a control for the updated compliance data exists, the analyze engine 104 may determine whether the control covers the updated compliance data. In the event the control data does not cover the updated compliance data, analyze engine 104 may generate a requirement for modifying the existing control to cover the updated compliance data. Analyze engine 104 may return the generated requirements. Deployment system 100 may output requirements to user device 146. Deployment system 100 may store the requirements in the database 144.

As a non-limiting example, scraping engine 102 may detect an updated code of advertising with the better business bureau (BBB). As an example input, the updated code on the (BBB) web site may read, "2.1 Advertisers may offer a price reduction or savings by comparing their selling price with: 2.1.1 Their own former selling price". Scraping engine 102 may extract the updated code from the BBB website and return the text of the updated code.

Analyze engine 104 may retrieve controls relevant to the updated code. The controls relevant to the updated code may be controls verifying the compliance of pricing and advertising. Analyze engine 104 may correlate the relevant controls with the updated code. Analyze engine 104 may correlate controls with the updated code by comparing the regulation ID of the updated code (i.e., 2.1 and 2.11) with the regulation ID of the compliance data currently used by the control.

Analyze engine 104 may determine whether a control exists to cover the updated code. In the event a control does not exist, analyze engine 104 may generate a requirement. Analyze engine 104 may determine whether a control exists for the updated compliance data. In the event a new control is needed for the updated compliance data, analyze engine 104 may generate a requirement for generating a new control for the updated compliance data. For example, the updated compliance data may be a new law, regulation, and/or statute. In the event a control for the updated compliance data exists, the analyze engine 104 may determine whether the control covers the updated compliance data. In the event the control data does not cover the updated compliance data, analyze engine 104 may generate a requirement for modifying the existing control to cover the updated compliance data.

Deployment system 100 may be configured to determine whether scraping engine 102 and/or analyze engine 104 are suitable for executing using multi-coring or multiprocessing. Multi-coring is the concept using dedicated cores to execute a single function. For the purposes of speed and efficiency, multi-coring may be executed asynchronously. In this regard, using multi-coring, the tasks of a function may be executed in an asynchronous order. Multiprocessing the running of two or more programs or sequences of instructions simultaneously by a computer with more than one central processor. Using multiprocessing deployment system 100 may execute the functions using anyone of the computing cores 116-124. In multi-coring one or more cores may be dedicated to only execute a single function. In multiprocessing any one of the computing cores may execute multiple functions in parallel or serially. Computing cores 114 may be a pool of computing cores 116-124. Computing cores 116-124 may be separate processing units configured to execute any function. Computing cores 116-124 may execute on one or more processors. Computing cores 116-124 independently or in combination with one another. Computing cores 114 may be part of the cloud computing system 140. Alternatively, computing cores 114 may be separate from the cloud computing system 140.

Deployment system 100 may determine whether a function is suitable for multi-coring or multiprocessing based on a series of steps. Initially, deployment system 100 may determine whether the code included in the function to be executed is computationally expensive. Deployment system 100 may determine the code is computationally expensive to execute based on an expected amount data to be processed by the code multiplied by an expected amount of calculations to be executed by the code. In response to determining the expected amount data to be processed by the code multiplied by the expected amount of calculations to be executed by the code is more than a threshold amount, the deployment system 100 may determine the code is computationally expensive. In response to determining code is not computationally expensive, deployment system may determine is the function is not suitable for multi-coring, as it may not be desirable to dedicate a set of resources to a function that is not computationally expensive to execute.

Next, deployment system 100 may determine whether the code of the function include calculations that are interdependent of each other. As described above, using multi-coring, the tasks of a function may be executed asynchronously. Accordingly, in the event a function includes calculations which are dependent on other calculations, multi-coring may not be suitable for this function as the calculations may be executed out of the desired order. Likewise, deployment system 100 also determines whether the function has interdependences with other functions. Multi-coring may not be suitable for a function in situations where the function is relying on other function calls, as the tasks of the function are executed asynchronously.

Next, deployment system 100 determines whether more than one function is computationally expensive. Multi-coring may not be suitable for when more than one function is computationally expensive as it may not be desirable to dedicate a large amount of computing cores to execute each computationally expensive function.

In the event deployment system 100 determines the code of the function is computationally expensive, does not include interdependent calculations, does not have interdependencies with other functions, and the more than one function are not computationally expensive, the deployment system 100 may determine the function may be suitable for multi-coring. Otherwise the deployment system 100 may determine the function is not suitable for multi-coring but rather is suitable for multiprocessing.

In the event a function is suitable for multi-coring, execution engine 150 may determine an amount of available computing cores. Execution engine 150 may determine the amount of computing cores necessary to execute the function. Execution engine 150 may assign the amount of computing cores from the available computing cores to execute the function. The assigned computing cores may execute the function and may not execute any other function until the function has completely executed. Execution engine 150 may execute the function on the assigned computing cores.

As the assigned computing cores execute the function asynchronously, the function may return data asynchronously. Execution engine 150 may receive the data from the function and store the data in a list data structure rather than a data frame data structure. In this regard, execution engine 150 can ensure a desired order of the data is maintained even though the data may be received out of order. As an example, in the event a function is configured to execute task 1, task 2, and task 3. The assigned computing cores may execute the tasks in the following order: task 2, task 3, and task 1, leading to return data from each of these tasks out of order. It may be desirable to maintain the order of returned data from task 1, task 2, and task 3. Accordingly, execution engine 150 may maintain the order of the returned data in the list data structure as follows: [returned value from task 1, returned value from task 2, and returned value from task 3]. Execution engine 150 may transpose the list data structure into a data frame data structure, once the function has completely executed.

Once the assigned computing cores have completed the execution of the function using multi-coring, the assigned computing cores may be deemed available for selection again.

In the event deployment system 100 determines a function is suitable for multiprocessing, the execution engine may assign the function to a process and execute the process. The process may be executed by any one of the available computing cores. Deployment system 100 may execute multiple functions at once using multiprocessing. The functions may be assigned to processes and executed. The processes may be structured as follows P1=Process (target=function 1, args( )); P2=Process(target=function 2, args( )); P3=Process(target=function 3, args( )). The args ( ) represent arguments required by each of the functions. The processes may be executed in parallel using any one of the available computing cores other than the computing cores dedicated to execute a function using multi-coring. The processes may be executed in parallel.

Figure 2:
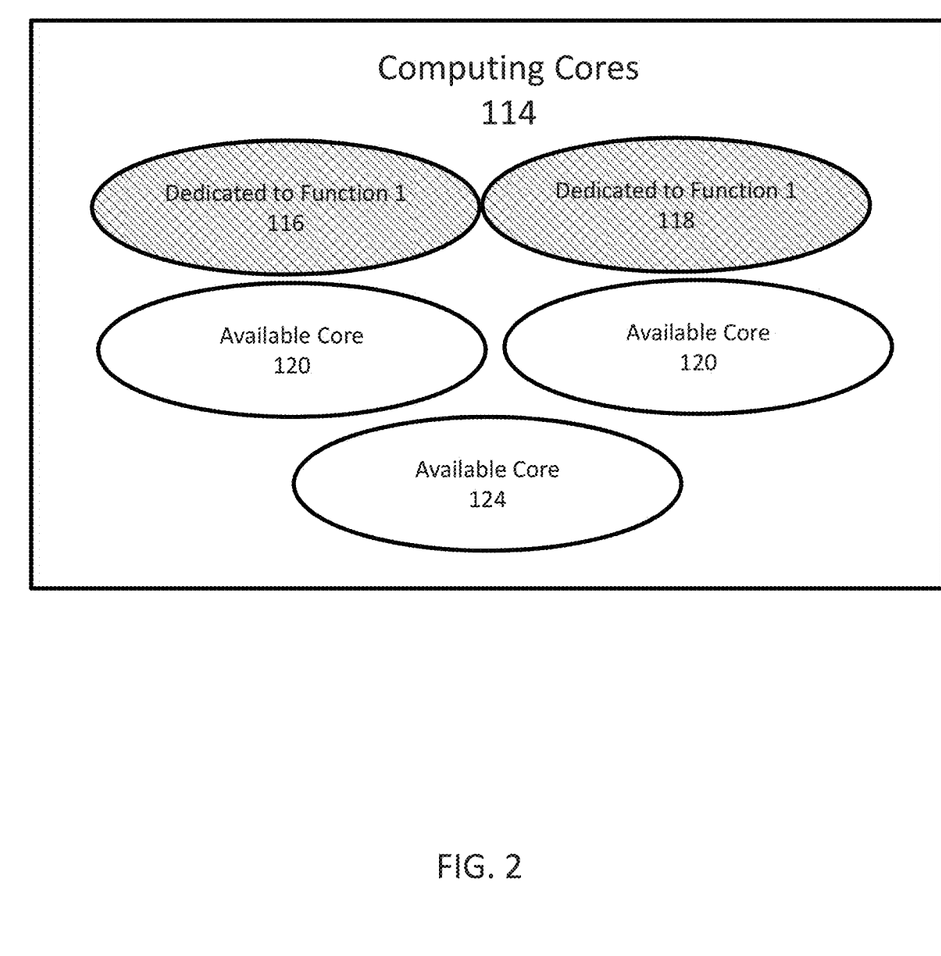
FIG. 2 illustrates example computing cores according to an embodiment.

With reference to FIG. 2, example computing cores according to an embodiment are illustrated. FIG. 1 and FIG. 2 will be described concurrently. As described above, computing cores 114 is a pool of computing cores 116-124. Each of the computing cores 116-124 may be configured to either execute multiple functions or may be instructed to be dedicated to execute a single function.

Due to the influx of data, deployment system 100 may determine whether scraping engine 102 is suitable for using multi-coring. Deployment system 100 may determine amount of data to be processed multiplied by the calculations to be performed will be greater than a threshold amount making it computationally expensive. Deployment system 100 may determine the calculations executed by scraping engine 102 are not interdependent on each other and scraping engine 102 is not interdependent with other functions. Deployment system 100 may also determine that other functions of deployment system 100 are not computationally expensive to execute based on an expected amount of data to be processed multiplied by an expected number of calculations to be executed. Accordingly, deployment system 100 may determine scraping engine 102 is suitable for multi-coring.

Deployment system 100 may determine computing cores 116-124 are available. Deployment system 100 may determine that two computing cores are necessary to execute scraping engine 102. Execution engine 150 may assign computing core 116 and 118 to execute scraping engine 102, as described above. The scraping engine 102 may return/ output a data frame data structure. The deployment system 100 may determine that because the scraping engine 102 will be executed asynchronously, the output data may be output out of order in the data frame data structure and therefore it may be necessary to receive the output data in a list data structure. As a non-limiting example, when executing multi-coring in Python, a collect_df function can be programmed using a df.values.tolist( ) function so that scraping engine 102 does not directly a data frame data structure rather a list data structure. The df.values.tolist( ) function converts a data frame data structure into a list data structure. In this regard, the collect_df function receives the output data as the data frame data structure scraping engine 102 is configured to output and converts the data frame data structure into a list data structure.

Execution engine 150 may execute the scraping engine 102 on computing cores 116 and 118 by instructing the assigned computing cores 116 and 118 to execute scraping engine 102 using the arguments required to execute scraping engine 102. Additionally, execution engine 150 may call a function (i.e., collect_df) to receive the output data of scraping engine 102 as a list data structure. As an example, while executing multi-coring using Python, execution engine 150 can execute function on computing cores 116 and 118 by executing the following call: pool.apply async (funct1, args=(x,y,z), callback=collect_df). Pool represents the assigned computing cores 116-118 dedicated to execute scraping engine 102. Apply async instructs computing cores 116-118 to execute the tasks of scraping engine 102 asynchronously. Funct1 may represent scraping engine 102. Args=(x,y,z) represent the arguments required to execute scraping engine 102. Callback represents a list data structure configured to receive data from scraping engine 102 using the collect_df function Execution engine 150 may convert the callback list data structure into a data frame data structure at the completion of the execution of scraping engine 102 by transposing the data in the callback list data structure into a data frame data structure. The data frame data structure may include all of the updated regulations, laws, and/or statutes and their respective regulation ID. Once the execution of scraping engine 102 is completed, computing cores 116-118 can be deemed available again and eligible for executing different functions.

Figure 3:
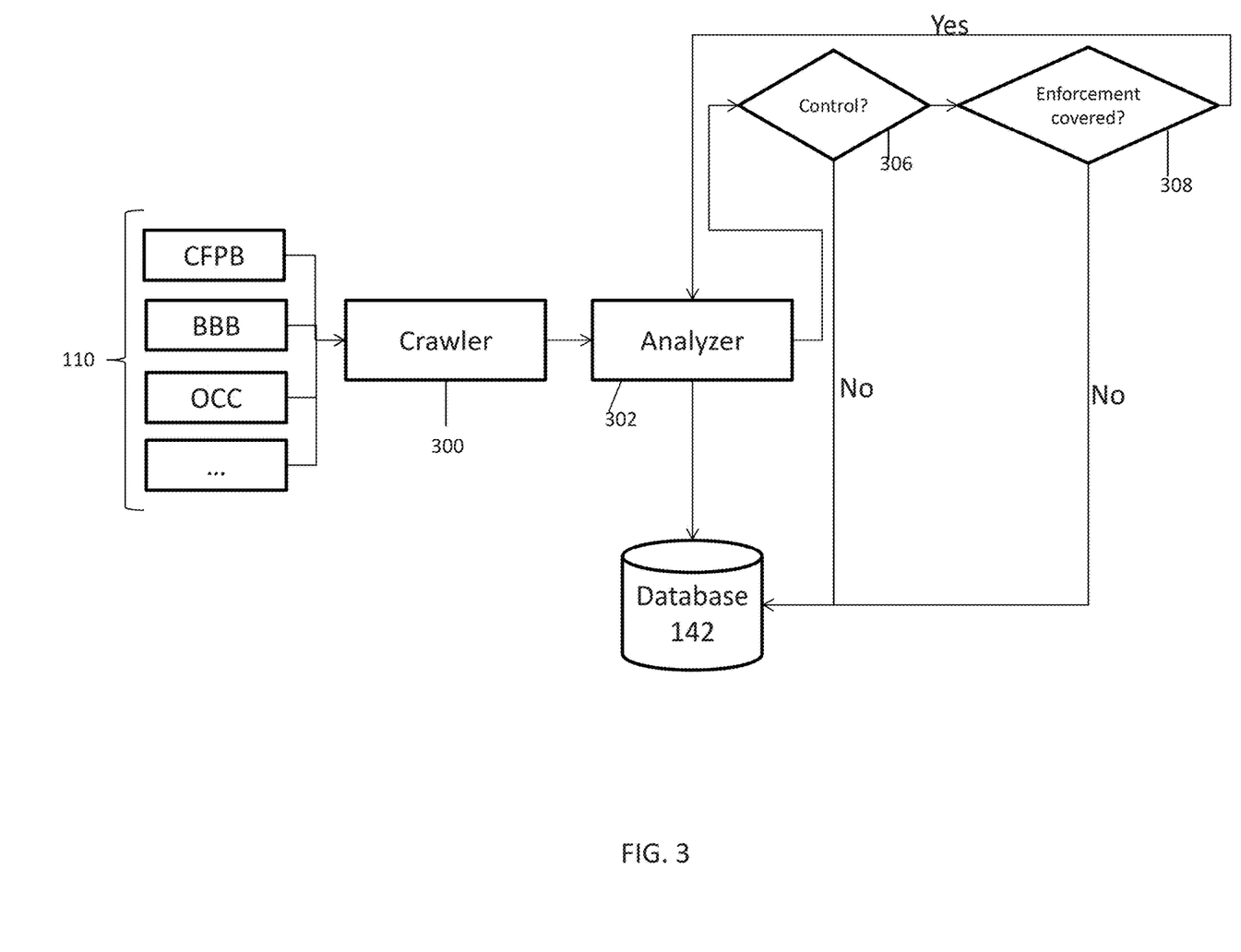
FIG. 3 illustrates example flow of compliance data according to an embodiment.

FIG. 3 illustrates example flow of compliance data according to an embodiment. A crawler 300 such as a scraping engine (e.g., scraping engine 102 as shown in FIG. 1) may detect and extract updated compliance data from external data sources 110. External data sources may include websites of the Consumer Financial Protection Bureau (CFPB), Better Business Bureau (BBB), Office of the Comptroller of the Currency (OCC), and/or the like.

An analyzer 302 such as an analyze engine (e.g., analyze engine 104 as shown in FIG. 1) may query database 142 to retrieve controls and compliance data currently used by the controls. Analyzer 302 may correlate the relevant controls with the updated compliance data using the regulation ID of the updated compliance data and the compliance data currently used by the controls.

In operation 304 analyzer 302 may determine whether a control exists to cover the updated compliance data. In the event a control does not exist, the analyzer 302 may generate a new requirement for generating a new control to cover the updated compliance data and store the new requirement in the database 142. In the event a control does exist, in operation 306, analyzer 302 may determine whether the control covers the updated compliance data. In the event the control does not cover the updated compliance data, analyzer 302 may generate a requirement for modifying the existing control and may store the requirement in database 142.

Figure 4:
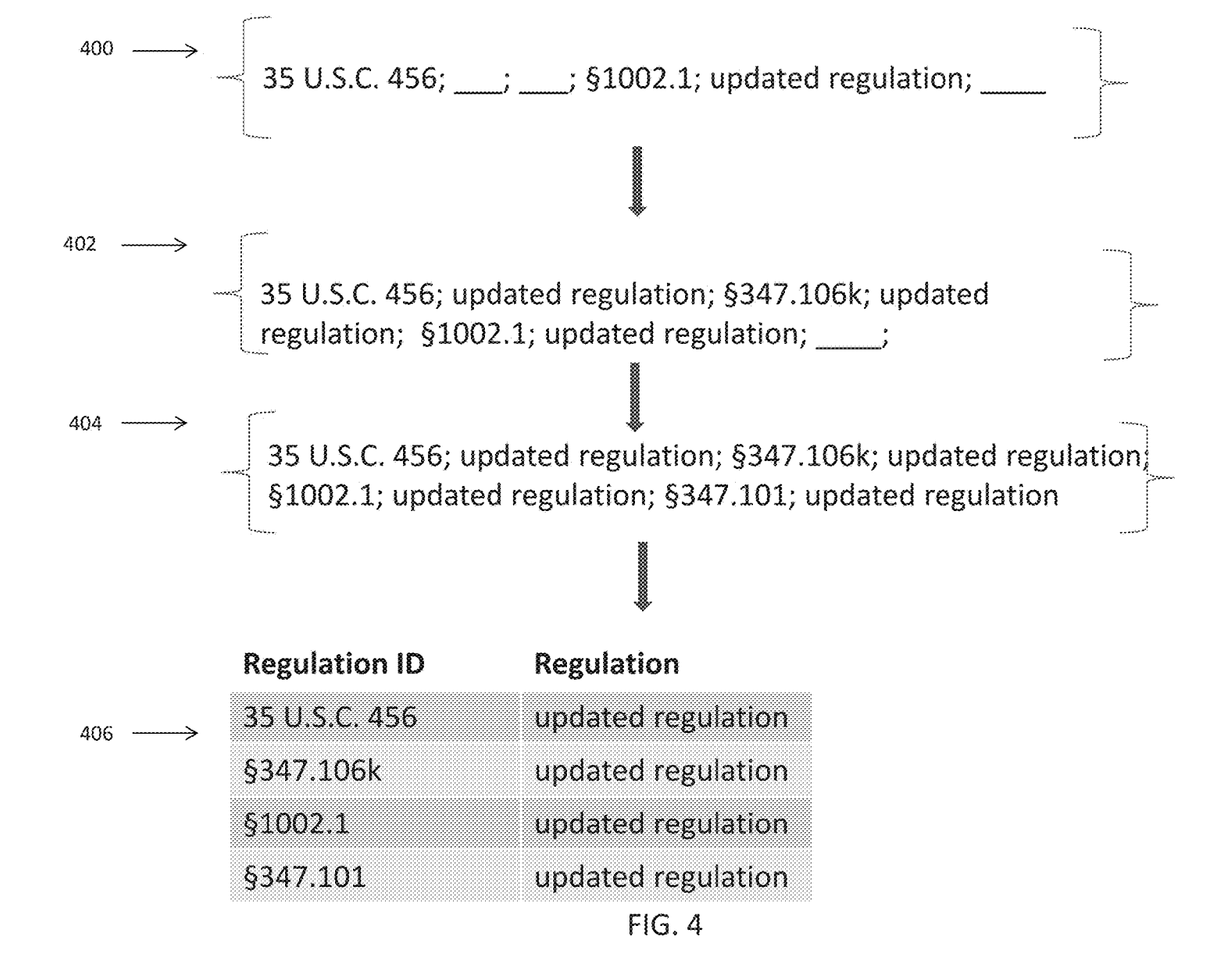
FIG. 4 illustrates example data structures according to an embodiment.

FIG. 4 illustrates example data structures according to an embodiment. As described above, while executing a function using multi-coring, the function completes the tasks asynchronously. A data frame data structure is a two-dimensional data structure, where data is aligned in a tabular fashion in rows and columns. The data may be associated to a key value pair. A list data structure is a one-dimensional changeable ordered sequence of elements. The function returns the data asynchronously to the function (i.e., collect_df) to receive the output data of scraping engine 102 as a list data structure. As the list data structure may receive the data asynchronously, the list data structure maintains a desired order so that the data in the list data structure can be accurately transposed to a data frame data structure.

As a non-limiting example, the deployment system (e.g., deployment system 100 as shown in FIG. 1) may deploy a function, such as the scraping engine, using multi-coring which preforms the task scraping external data sources for compliance data different than the compliance data currently used by compliance applications. The compliance data may include laws or regulations that determine compliance of an entity. The compliance data may be alphanumeric text. As the scraping engine is executed, the execution engine starts receiving output from the scraping engine as the function completes the respective tasks asynchronously. The output data can include an updated law or regulation and regulation ID identifying the law or regulation. The regulation ID can be a statute number, US Title and Section number, and/or the like. The regulation ID can be the key value pair. The execution engine stores the output data in a list data structure 400. List data structure 400 may include regulation ID "35 U.S.C. 456" and may be missing the updated regulation. List data structure 400 may further include regulation ID § 1200.1 and the updated regulation. As shown by list data structure 400, the execution engine may store the data in a particular order such that the regulation ID and the updated regulation are adjacent to one another. However, it can be appreciated that the execution engine may store the data in any specified order such that the data from the list data structure may be transposed to a data frame data structure.

List data structure 402 may store more data as the function completes more tasks. The execution engine may receive the updated regulation for regulation ID "35 U.S.C. 456". Accordingly, list data structure 402 may store the updated regulation for code number "35 U.S.C. 456" in its designated positions in list data structure 402. The execution engine may also receive regulation ID "§ 347.106k" and the updated regulation. Accordingly, list data structure 302 may store regulation ID "§ 347.106k" and the updated regulation in its respective position in the list data structure 402.

As the function completes its final tasks, the execution engine may receive regulation ID "§ 347.101" and the updated regulation. Accordingly, list data structure 404 may store receive regulation ID "§ 347.101" and the updated regulation in their designated positions in list data structure 404.

Once the function has completed all of its tasks, the execution engine may determine list data structure 404 is complete. The execution engine may then transpose the values of list data structure 404 into a data frame data structure 406. As a non-limiting example, data frame data structure 406 may be set up to include two rows and four columns. The first column may store regulation ID numbers, the second column stores the alphanumeric text of the updated regulation. The regulation ID number may be the key value pair. The execution engine transposes the value in the order maintained by list data structure 404. For example, "35 U.S.C. 456" and the updated regulation are transposed into the first row; "§ 347.101" and the updated regulation are transposed into the second row; "§ 1200.1" and the updated regulation are transposed into the third row; "§ 347.101" and the updated regulation are transposed to the fourth row. Data frame data structure 406 may store the data in the desired order, such that information for each updated regulation is stored in a single row.

Figure 5:
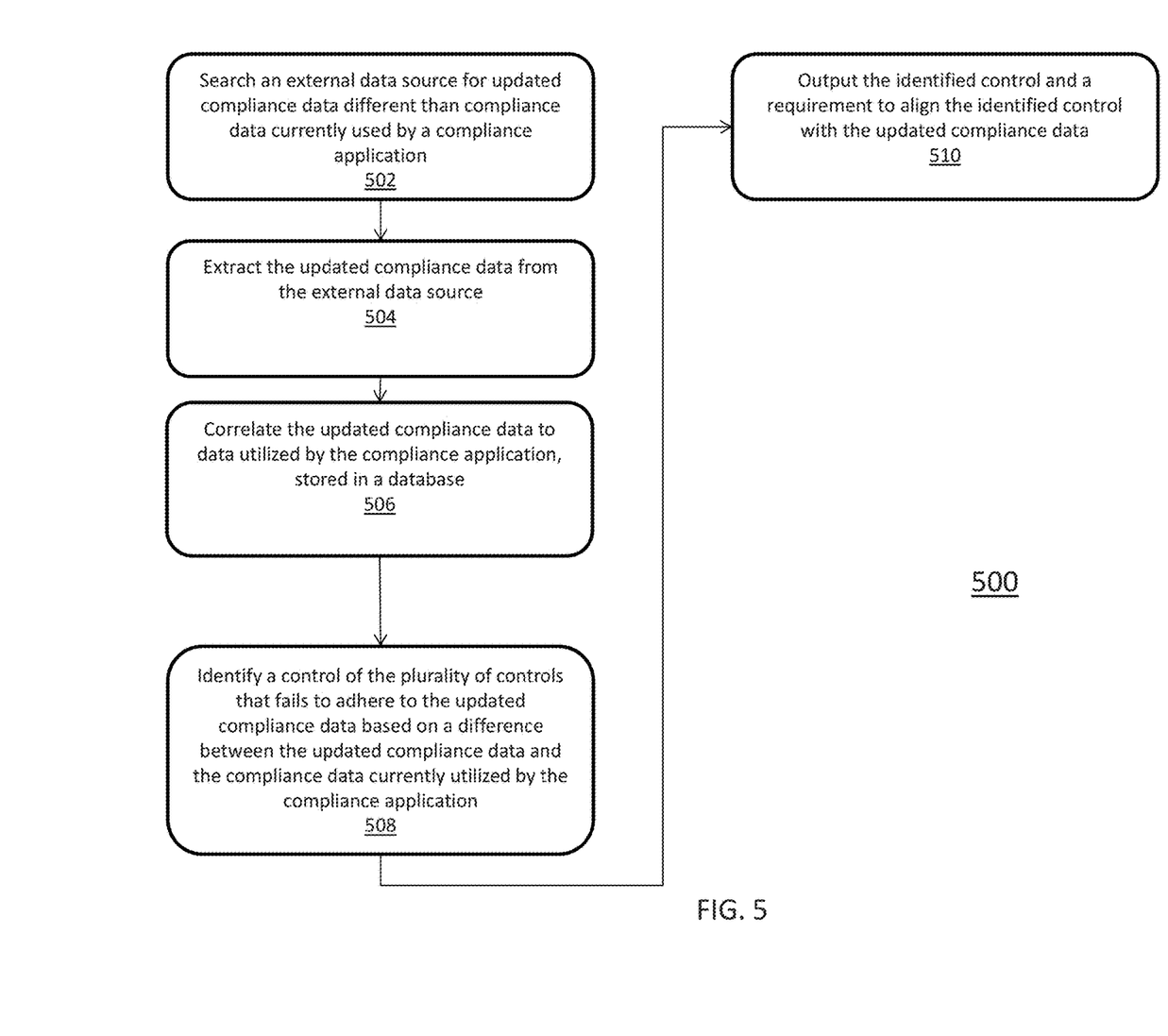
FIG. 5 is a flowchart illustrating a process for identifying controls not aligned with updated compliance data according to an embodiment.

FIG. 5 is a flowchart 500 illustrating a process for identifying controls which do not align with updated compliance data according to an embodiment.

Flowchart 500 starts at operation 502. In operation 502, a scraping engine may search an external data source for updated compliance data different than compliance data currently used by a compliance application. Scraping engine may be a SCRAPY application developed in python. SCRAPY is an open-source web crawling framework written in Python. SCRAPY is built using self-contained crawlers that may be given a set of instructions. External data sources may include websites, databases, data repositories, RSS feeds, web services, and/or the like.

In operation 504, the scraping engine may extract the updated compliance data from the external data source. The scraping engine may extract the alphanumeric string of the updated compliance data from the external data source.

In operation 506, an analyze engine may correlate the updated compliance data to the data utilized by the compliance application stored in a database. The analyze engine may correlate the updated compliance data with the compliance data by matching a regulation ID number of the updated compliance data with a regulation ID of the compliance data.

In operation 508, the analyze engine identifies a control that fails to adhere to the updated compliance data based on a difference between the updated compliance data and the compliance data currently used by the compliance application. The control may control the operation of the compliance application based on the compliance data.

In operation 510, the analyze engine outputs the identified controls and a requirement to align the identified control with the updated compliance data. The analyze engine may store the requirement in the database.

Figure 6:
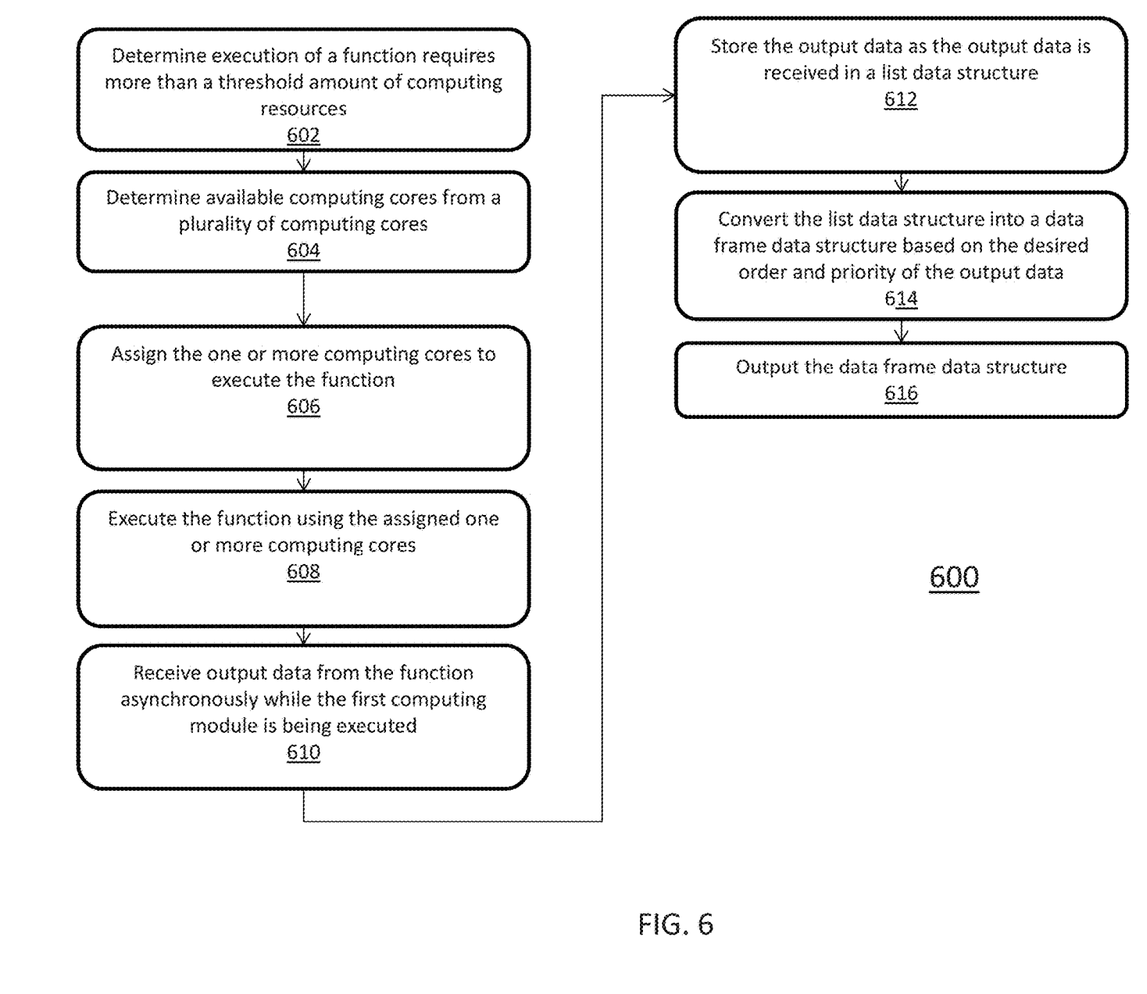
FIG. 6 is a flowchart illustrating a process for executing a function using multi-coring according to an embodiment.

FIG. 6 is a flowchart 600 illustrating a method for executing a function using multi-coring according to an embodiment. Searching an external data source for updated compliance data different than compliance data used by a compliance application may be executed by a function (i.e., scraping engine 102 as shown in FIG. 1).

Flowchart 600 starts at operation 602. In operation 602, a deployment system may determine execution of a function of a first computing module requires more than a threshold amount of computing resources. Computing resources may include memory, CPU power, storage space, and/or the like. The function of the first computing module may be code to be executed. The deployment system may determine execution of the function is computationally expensive based on an expected amount data to be processed by the function multiplied by an expected amount of calculations to be executed by the function.

In operation 604, an execution engine may determine available computing cores. The execution engine may identify the available computing cores from a pool of computing cores. Each computing core can be a separate processing unit.

In operation 606, the execution engine may assign the one or more computing cores to execute the function of the first computing module.

In operation 608, the execution engine may execute the function of the first computing module using the assigned one or more computing cores. The assigned one or more computing cores are dedicated to executing the function of the first computing module. The execution engine may transmit a call to the assigned one or more computing cores. The call may include instructions to the assigned one or more computing cores to execute the function asynchronously. The call may further include arguments required by the function to perform the tasks of the function. The call may further include a different call to a function for converting a data frame data structure to be output by the function to a list data structure.

In operation 610, the execution engine may receive output data from the function of the first computing module asynchronously while the function of the first computing module is being executed. Each of the tasks of the function may be executed asynchronously. For example, the function may include task 1; task 2; and task 3 and task 1, task 2, and task 3 may be executed concurrently by the assigned computing cores. The assigned computing cores may execute different tasks of the function irrespective of their order within the function. The function may output data in response to completing a task irrespective of the order of the task in the function. In the event task 3 is completed before task 1, the function will output the result of task 3 before task 1.

In operation 612, the execution engine may store the output data as the output data is received in a list data structure as described with respect to operation 408. As the data is being received asynchronously, the list data structure maintains a desired order of the output data.

In operation 614, the execution engine may convert the list data structure into a data frame data structure based on the desired order and priority of the output data. The list may be a one-dimensional data structure and the data frame data structure may be a two-dimensional data structure. The execution engine may transpose the output data from the list data structure to the data frame data structure. The execution engine may ensure the data is transposed from the list to the data frame in the desired order.

In operation 616, the deployment system may output the data frame data structure. The data frame data structure may be output to a user device. Alternatively, the data frame data structure may be output to a different sub-computing system within a distributed and/or cloud computing environment, for further processing.

Figure 7:
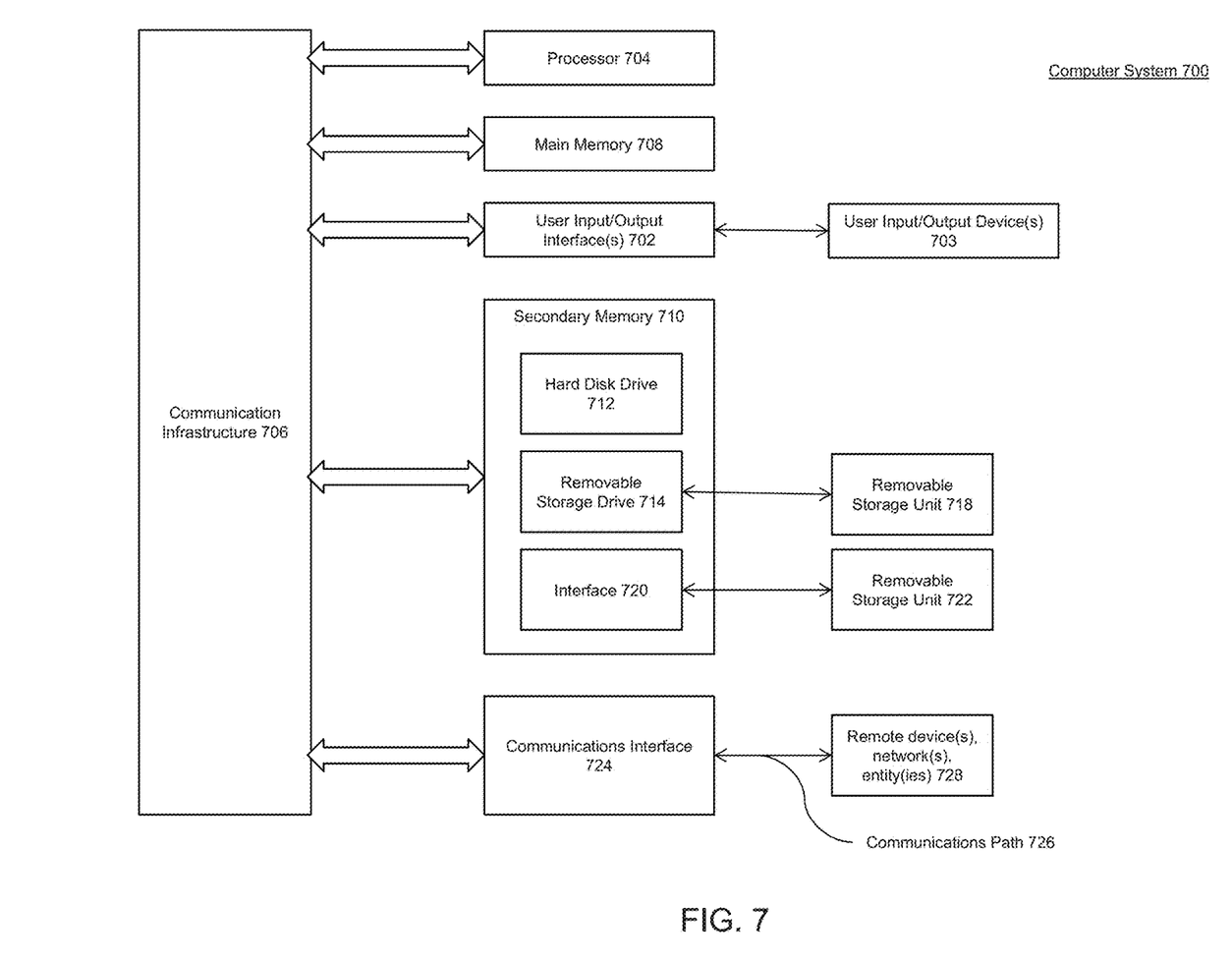
FIG. 7 is a block diagram of example components of device according to an embodiment.

FIG. 7 is a block diagram of example components of device 700. One or more computer systems 700 may be used, for example, to implement any of the embodiments discussed herein, as well as combinations and sub-combinations thereof. Computer system 700 may include one or more processors (also called central processing units, or CPUs), such as a processor 704. Processor 704 may be connected to a communication infrastructure or bus 706.

Computer system 700 may also include user input/output device(s) 703, such as monitors, keyboards, pointing devices, etc., which may communicate with communication infrastructure 706 through user input/output interface(s) 702.

One or more of processors 704 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 may also include a main or primary memory 708, such as random access memory (RAM). Main memory 708 may include one or more levels of cache. Main memory 708 may have stored therein control logic (i.e., computer software) and/or data.

Computer system 700 may also include one or more secondary storage devices or memory 710. Secondary memory 710 may include, for example, a hard disk drive 712 and/or a removable storage device or drive 714.

Removable storage drive 714 may interact with a removable storage unit 718. Removable storage unit 718 may include a computer usable or readable storage device having stored thereon computer software (control logic) and/or data. Removable storage unit 718 may be program cartridge and cartridge interface (such as that found in video game devices), a removable memory chip (such as an EPROM or PROM) and associated socket, a memory stick and USB port, a memory card and associated memory card slot, and/or any other removable storage unit and associated interface. Removable storage drive 714 may read from and/or write to removable storage unit 718.

Secondary memory 710 may include other means, devices, components, instrumentalities or other approaches for allowing computer programs and/or other instructions and/or data to be accessed by computer system 700. Such means, devices, components, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 may enable computer system 700 to communicate and interact with any combination of external devices, external networks, external entities, etc. (individually and collectively referenced by reference number 728). For example, communication interface 724 may allow computer system 700 to communicate with external or remote devices 728 over communications path 726, which may be wired and/or wireless (or a combination thereof), and which may include any combination of LANs, WANs, the Internet, etc. Control logic and/or data may be transmitted to and from computer system 700 via communication path 726.

Computer system 700 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 700 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 700 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), may cause such data processing devices to operate as described herein.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method comprising:
   determining, by at least one computing device, a number of computing cores needed for searching based on an amount of data to be searched;
   searching, by the number of computing cores, an external data source for updated compliance data different than compliance data currently used by a compliance application, the searching including searching for predefined alphanumeric strings;
   identifying the updated compliance data based on a comparison of a timestamp associated with the updated compliance data to a predetermined time period;
   extracting, by the at least one computing device, the updated compliance data from the external data source;
   correlating, by the at least one computing device, the updated compliance data to the compliance data currently used by the compliance application;
   generating, by the at least one computing device, a requirement for a control to adhere to the updated compliance data, wherein the requirement modifies or is used to generate the control based on whether the control exists to cover the updated compliance data and whether the control fails to adhere to the updated compliance data based on a difference between the updated compliance data and the data currently used by the compliance application; and
   outputting, by the at least one computing device, the control and the requirement.

2. The computer-implemented method of claim 1, wherein the compliance application is configured to verify an entity's compliance based on compliance data.

3. The computer-implemented method of claim 2, wherein the control governs an action executed by the compliance application based on the compliance data.

4. The computer-implemented method of claim 1, further comprising outputting, by the at least one computing device, the requirement to a user device.

5. The computer-implemented method of claim 1, wherein the
   identifying further includes determining the difference between the updated compliance data and the compliance data currently used by the compliance application.

6. The computer-implemented method of claim 1, further comprising assigning, by the at least one computing device, in response to determining that execution of a function requires more than a threshold amount of computing resources, one or more computing cores identified from available computing cores of a plurality of computing cores.

7. The computer-implemented method of claim 1, further comprising:
   receiving, by the at least one computing device, the updated compliance data from a function asynchronously while the function is being executed;
   storing, by the at least one computing device, the updated compliance data as the updated compliance data is received in a list data structure, wherein the list data structure maintains a desired order of output data,
   converting, by the at least one computing device, the list data structure into a data frame data structure based on the desired order and priority of the updated compliance data; and
   outputting, by the at least one computing device, the data frame data structure.

8. The computer-implemented method of claim 1, wherein the searching is executed by a function using one or more computing cores dedicated to executing the searching.

9. A system comprising:
   a memory;
   a processor in communication with the memory, configured to:
   determine a number of computing cores needed for searching based on an amount of data to be searched;
   cause the number of computing cores to search an external data source for updated compliance data different than compliance data currently used by a compliance application, the searching including searching for predetermined alphanumeric strings;
   identify the updated compliance data based on a comparison of a timestamp associated with the updated compliance data to a predetermined time period;
   extract the updated compliance data from the external data source;
   correlate the updated compliance data to the compliance data currently used by the compliance application;
   generate, by the processor, a requirement for a control to adhere to the updated compliance data, wherein the requirement modifies or is used to generate the control based on whether the control exists to cover the updated compliance data and whether the control fails to adhere to the updated compliance data based on a difference between the updated compliance data and the data currently used by the compliance application; and
   output the control and the requirement.

10. The system of claim 9, wherein the compliance application is configured to verify an entity's compliance based on the compliance data.

11. The system of claim 10, wherein the control governs an action executed by the compliance application based on compliance data.

12. The system of claim 9, wherein
   the identifying the updated compliance data from the external data source further includes determining the difference between the updated compliance data and the compliance data currently used by the compliance application.

13. The system of claim 9, wherein the processor is further configured to:
   assign, in response to determining that execution of a function requires more than a threshold amount of computing resources, one or more computing cores identified from available computing cores of a plurality of computing cores.

14. The system of claim 9, wherein the processor is further configured to:
   receive the updated compliance data from a function asynchronously while the function is being executed;
   store the updated compliance data as the updated compliance data is received in a list data structure, wherein the list data structure maintains a desired order of output data,
   convert the list data structure into a data frame data structure based on the desired order and priority of the updated compliance data; and
   output the data frame data structure.

15. The system of claim 9, wherein the searching is executed by a function using one or more computing cores dedicated to executing the searching.

16. A non-transitory computer-readable medium having instructions stored thereon, execution of which, by one or more processors of a device, causes the one or more processors to perform operations comprising:

determining a number of computing cores needed for searching based on an amount of data to be searched;

causing the number of computing cores to search an external data source for updated compliance data different than compliance data currently used by a compliance application, the searching including searching for predefined alphanumeric strings;

identifying the updated compliance data based on a comparison of a timestamp associated with the updated compliance data to a predetermined time period;

extracting the updated compliance data from the external data source;

correlating the updated compliance data to the compliance data currently used by the compliance application;

generating a requirement for a control to adhere to the updated compliance data, wherein the requirement modifies or is used to generate the control based on whether the control exists to cover the updated compliance data and whether the control fails to adhere to the updated compliance data based on a difference between the updated compliance data and the data currently used by the compliance application; and outputting the control.

17. The non-transitory computer-readable medium of claim 16, wherein the identifying further includes determining the difference between the updated compliance data and the compliance data currently used by the compliance application.

18. The non-transitory computer-implemented medium of claim 16, the operations further comprising:

assigning, in response to determining that execution of a function requires more than a threshold amount of computing resources, one or more computing cores identified from available computing cores of a plurality of computing cores.

* * * * *